(12) United States Patent
Block

(10) Patent No.: US 9,189,195 B2
(45) Date of Patent: Nov. 17, 2015

(54) INTEGRITY MONITORING

(75) Inventor: Gerald J. Block, Vista, CA (US)

(73) Assignee: SANDEL AVIONICS, INC., Vista, CA (US)

( * ) Notice: Subject to any disclaimer, the term of this patent is extended or adjusted under 35 U.S.C. 154(b) by 101 days.

(21) Appl. No.: 13/366,926

(22) Filed: Feb. 6, 2012

(65) Prior Publication Data

US 2012/0203997 A1    Aug. 9, 2012

Related U.S. Application Data

(63) Continuation-in-part of application No. 11/872,643, filed on Oct. 15, 2007, now Pat. No. 8,111,920.

(60) Provisional application No. 60/851,950, filed on Oct. 16, 2006, provisional application No. 60/852,246, filed on Oct. 16, 2006.

(51) Int. Cl.
| | |
|---|---|
| G06F 12/14 | (2006.01) |
| G06F 12/02 | (2006.01) |
| G06F 3/147 | (2006.01) |
| G01C 25/00 | (2006.01) |
| G06F 9/50 | (2006.01) |
| G01C 23/00 | (2006.01) |

(52) U.S. Cl.
CPC ............... *G06F 3/147* (2013.01); *G01C 23/00* (2013.01); *G01C 25/00* (2013.01); *G01C 23/005* (2013.01); *G06F 9/5077* (2013.01); *G06F 12/0284* (2013.01); *G06F 12/14* (2013.01); *G06F 12/1441* (2013.01); *G09G 2380/12* (2013.01)

(58) Field of Classification Search
CPC ..... G06F 12/023; G06F 3/067; G06F 9/5016; G06F 3/0605; G06F 3/0631; G06F 3/147; G06F 9/5077; G06F 12/0223; G06F 12/0284; G06F 12/1441; G01C 23/00; G01C 23/005; G09G 2380/12
USPC ............................................................ 711/170
See application file for complete search history.

(56) References Cited

U.S. PATENT DOCUMENTS

| | | | |
|---|---|---|---|
| 5,666,111 | A | 9/1997 | Servat et al. |
| 5,969,670 | A | 10/1999 | Kalafus et al. |
| 7,724,155 | B1 | 5/2010 | Anderson et al. |
| 7,724,259 | B2 | 5/2010 | Hedrick et al. |

(Continued)

FOREIGN PATENT DOCUMENTS

WO    WO0142932 A1 *  6/2001    ............... G06F 13/00

*Primary Examiner* — Charles Rones
*Assistant Examiner* — Andrew Russell
(74) *Attorney, Agent, or Firm* — Mark D. Wieczorek; Mayer & Williams PC

(57) ABSTRACT

Systems and methods are described here to provide a degree or level of certification to a resident application such as an operating system, e.g., Linux®. In a Linux® implementation, the operating system provides a robust environment including many seasoned communication stacks, e.g., TCP/IP, USB, and the like. However, Linux® is not certified to the level necessary to be a part of many avionics applications. To eliminate the need to certify all of such an operating system, such certification being highly costly, the avionics application itself may be protected so that the operating system cannot alter the application's operating environment, e.g., application code and data, once the application is loaded and running. In this case, only the application requires certification at the highest level, and not the operating system such as Linux®.

11 Claims, 7 Drawing Sheets

(56) References Cited

U.S. PATENT DOCUMENTS

| | | | |
|---|---|---|---|
| 2002/0144010 A1* | 10/2002 | Younis et al. | 709/314 |
| 2003/0101322 A1* | 5/2003 | Gardner | 711/163 |
| 2003/0163662 A1* | 8/2003 | Glew et al. | 711/202 |
| 2004/0070920 A1* | 4/2004 | Flueli | 361/500 |
| 2004/0170046 A1* | 9/2004 | Belnet et al. | 365/145 |
| 2005/0024341 A1* | 2/2005 | Gillespie et al. | 345/173 |
| 2005/0288939 A1 | 12/2005 | Peled et al. | |
| 2006/0001553 A1* | 1/2006 | Hedrick | 340/971 |
| 2006/0059253 A1 | 3/2006 | Goodman et al. | |

* cited by examiner

INTEGRITY MONITORING

CROSS-REFERENCE TO RELATED APPLICATIONS

This application is a continuation-in-part of U.S. patent application Ser. No. 11/872,643, filed Oct. 15, 2007, entitled "CLOSED-LOOP INTEGRITY MONITOR", now U.S. Pat. No. 8,111,920, owned by the assignee of the present application and hereby incorporated by reference in its entirety.

BACKGROUND

Prior to the introduction of software to the cockpit suite, mechanical flight indicators were designed to fail in an obvious fashion. In this way, pilots would immediately notice their faulty character, and could take appropriate action. Current instruments, however, often include significant amounts of embedded software.

The Federal Aviation Administration has established strict guidelines regarding the allowance of embedded software in avionics instrumentation in aircraft, e.g., the standard DO-178B was established by the FAA's Advisory Circular AC20-115B. DO-178B established categories A-E into which instrumentation is classified. Category "A" corresponds to the most vital instrumentation, that whose failure is often catastrophic, e.g., altitude indicators, airspeed indicators, and attitude indicators. Category "B" corresponds to instrumentation whose failure is hazardous, and so on. Category "E" corresponds to instrumentation whose failure has virtually no effect.

The time and expense of certifying an instrument to a given level is proportional to the category: category "A" instruments require an elaborate and inordinate amount of time and expense to certify, while category "E" instruments require much less so, with the intermediate products in between. This is in many cases converse to the consideration of the level of complexity of the instrument: i.e., category "A" instruments typically deliver simple types of information, e.g., airspeed, attitude, etc., while lower category instruments deliver much more complex information, e.g., navigational displays.

There is currently a trend in avionics instrumentation to provide a cluster of instruments on a single large display. However, if the cluster includes instruments of more than one category, all instruments must be certified to the highest category. For complex, lower-category instruments, this may translate to an extraordinary amount of testing to certify a complex instrument to a category "A".

SUMMARY OF THE INVENTION

Systems and methods are provided for operating an avionics component to a given level of certification. Steps of the method include: receiving data from a sensor and sending the data to at least two components, a data monitor and an integrity monitor, the data monitor operating at a first level of certification and the integrity monitor operating at a second level of certification, the second level higher than the first level; rendering the data sent to the data monitor on a data display; using the integrity monitor, determining where at least one feature of the rendered data should appear on the data display; checking if the at least one feature of the rendered data properly appears on the data display, and if it does not, causing an error condition to appear on the data display. The system includes: a sensor for sensing a condition of an aircraft; a data monitor for receiving data from the sensor and for at least rendering the data such that the data may be graphically displayed on a data display, the data monitor certified to a first category level; an integrity monitor for receiving the same data from the sensor as the data monitor and for calculating from the data where at least one feature of the rendered data should appear on the data display, the integrity monitor certified to a second category level, the second category level higher than the first category level, such that if the at least one feature of the rendered data does not appear on the data display at a proper location, the integrity monitor causes an error condition to appear on the data display.

It is noted that in certain embodiments the given level of certification desired may be higher than either of that of the data monitor or that of the integrity monitor. However, the combination of the certification levels of the data monitor and the integrity monitor may result in a higher certification level, such as the desired given certification level.

In one aspect, the invention is directed to a method of operating an avionics component to a given level of certification. Steps include: receiving data from a sensor and sending the data to at least two components, a data monitor and an integrity monitor, the data monitor operating at a first level of certification and the integrity monitor operating at a second level of certification, the second level higher than the first level; rendering the data sent to the data monitor on a data display; using the integrity monitor, determining where at least one feature of the rendered data should appear on the data display; checking if the at least one feature of the rendered data properly appears on the data display, and if it does not, causing an error condition to appear on the data display.

In another aspect, the invention is directed to an avionics component, including: a sensor for sensing a condition of an aircraft; a data monitor for receiving data from the sensor and for at least rendering the data such that the data may be graphically displayed on a data display, the data monitor certified to a first category level; an integrity monitor for receiving the same data from the sensor as the data monitor and for calculating from the data where at least one feature of the rendered data should appear on the data display, the integrity monitor certified to a second category level, the second category level higher than the first category level, such that if the at least one feature of the rendered data does not appear on the data display at a proper location, the integrity monitor causes an error condition to appear on the data display.

Implementations of the invention may include one or more of the following. The checking may be performed by a pixel sniffer, such as one employing pixel decimation or color range comparison. The comparison made by, e.g., the pixel sniffer, may be to a specified level of tolerance, such as 90%, 95%, and so on. The error condition may be such that a flag appears on the screen or that a blank screen appears. The sensor, data, data monitor, and data display may be, e.g., an altimeter, an airspeed indicator, or an attitude indicator. If the instrument is an attitude indicator, the at least one feature of the rendered data may correspond to at least two points on a horizon line. If the instrument is an airspeed indicator or an altimeter, the at least one feature of the rendered data may correspond to numerals of a numeric display. The second level of certification may be category A, and the first level of certification may be category C. The integrity monitor may be structured and configured to check the integrity of a plurality of data monitors.

In another aspect, the invention is directed to a computer-readable medium containing instructions for causing a computer to execute the method.

In one aspect, the invention is directed towards a method of operating an avionics component, including: configuring settings of a memory management unit to allocate a region of memory for an operating system and a region of memory for an application, the two regions non-overlapping; running an operating system for the avionics component, within its allocated memory region; running the application, the application associated with the avionics component within its allocated memory region; and monitoring the memory management unit to ensure the operating system cannot alter memory allocated to the application.

Implementations of the invention may include one or more of the following. The operating system may be Linux®. The memory management unit may be monitored to ensure the operating system cannot address or write to memory allocated to the application. If the monitoring indicates that the settings are such that the operating system can affect the memory allocation associated with the application, then the method may further include causing an alert, e.g., a visible or audible alert, or both, for causing a substantially blank screen to appear. The application may be selected from the group consisting of: an altimeter, an airspeed indicator, a navigational indicator, and an attitude indicator. The monitoring may include monitoring a plurality of memory management units. The memory management unit, operating system, and application, may be associated with the same avionics component. The memory management unit may configure memory allocation such that application memory is unaddressable by the operating system.

In another aspect, the invention is directed towards a non-transitory computer-readable medium containing instructions for causing a computer to execute the above method.

In another aspect, the invention is directed towards an avionics component, including: non-transitory memory containing instructions for causing instantiation of an operating system; non-transitory memory containing instructions for causing instantiation of an application; non-transitory memory, configured by settings, containing instructions for separating the memories containing instructions for causing instantiation of an operating system and instantiation of an application; and non-transitory memory containing instructions for checking the operation of the memory configured by settings.

In another aspect, the invention is directed towards a method of operating an avionics component, including: receiving data from a sensor or other data source; causing an indication of the received data to appear on a display device, the display operating at a first level of certification; and monitoring the display device with an integrity monitor, the integrity monitor operating at a second level of certification, the second level higher than the first level.

Implementations of the invention may include one or more of the following. The display device may be a tablet computer. The monitoring may include causing the display device to perform a calculation on a known value; sending the results of the calculation to the integrity monitor; and if the display device does not achieve a known result corresponding to the calculation and the known value, then causing an error alert, e.g., one that is visible or audible, or one causing a substantially blank screen. The integrity monitor may be implemented as a separate instrument, or may be implemented in a non-transitory computer-readable medium. The monitoring the display device with an integrity monitor may include monitoring a display of the indication of the received data.

In another aspect, the invention is directed towards a non-transitory computer-readable medium containing instructions for causing a computer to execute the above method.

BRIEF DESCRIPTION OF THE FIGURES

Like reference numerals refer to like elements throughout.

DESCRIPTION

In this description, for exemplary purposes only, an attitude monitor is described. Such a monitor requires a category A certification. The display for this attitude monitor is designed, according to embodiments of the invention, to require a lesser certification, e.g., a category C certification. However, it should be noted that the invention is much broader than this embodiment. In particular, the invention may be employed to lessen the display categorization needed for any given device, and to any desired level of certification. In most cases, this will mean lessening an A or B certification to a lower category, such as a C. Typical category A devices to which the invention will apply may be monitors of attitude, altitude, or airspeed.

Moreover, neither the data monitor nor the integrity monitor need necessarily to be certified to the desired given certification level—rather, their combination may result in the desired certification level.

The present invention employs a particular variety of redundant monitor, herein termed an integrity monitor, to check the status of another device. The integrity monitor is certified to the highest category required, either due to its type or due to the type of other devices in the cluster in which it sits. Thus, to certify a class A device, such as the monitors above, the integrity monitor must be certified to class A, or the combination of the data monitor and the integrity monitor should be certified to class A.

Figure 1:
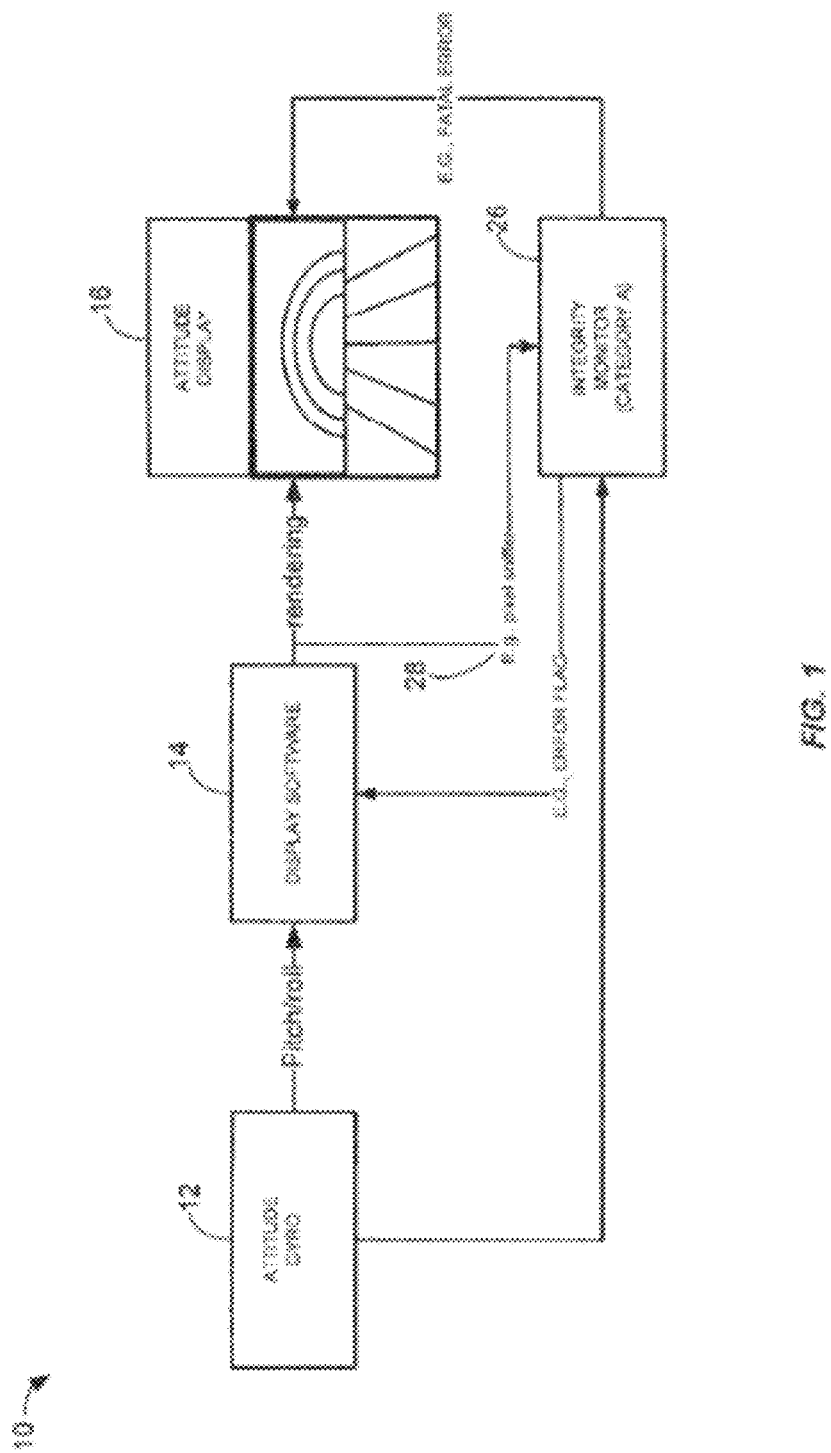
FIG. 1 shows a schematic diagram of a closed-loop integrity monitor according to the principles described here.
Figure 2:
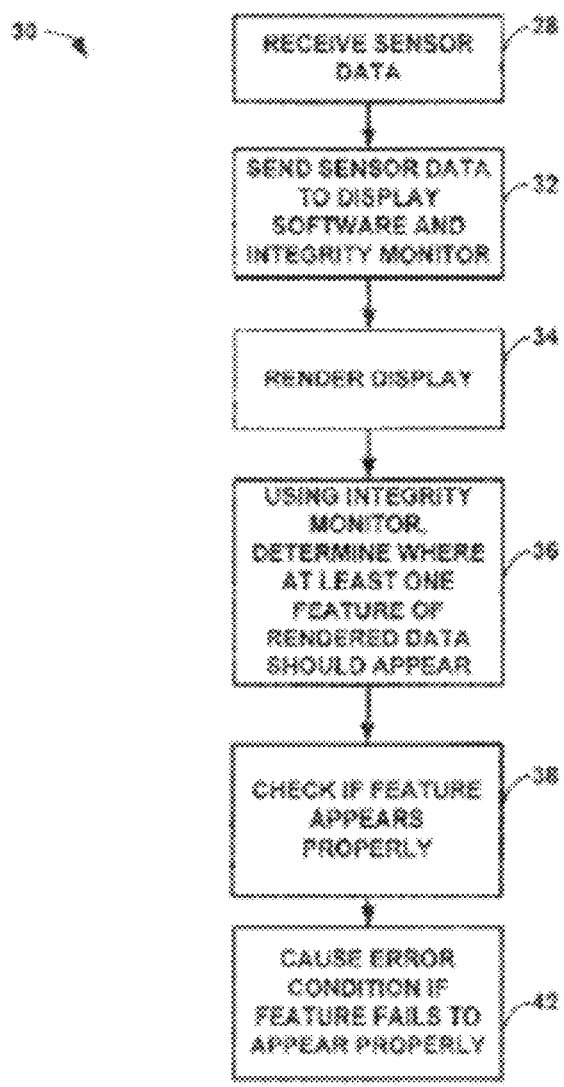
FIG. 2 shows a flowchart of a method according to principles described here.

FIG. 1 shows the system 10 and FIG. 2 shows the method 30. As shown in FIG. 109, an attitude gyro 12, shown for exemplary purposes only, creates data from its incorporated sensor (step 28) sends its sensed data (step 32) such as pitch and roll to display software 14. The sensor, display software, and display have been, in this exemplary embodiment, certified to, e.g., a category C level. This is two levels less than a typical attitude monitor. The display software 14 then causes the pitch and roll data to be displayed graphically on the attitude display 16 (step 34).

The attitude gyro 12 also sends a parallel set of data (step 32) to an integrity monitor 26, which has been certified to, e.g., a category A level. The integrity monitor 26 may exist entirely in software, hardware, or a combination of both, and typically has no separate display associated therewith.

The integrity monitor 26 thus receives data from a device sensor (in FIG. 1, gyro 12) and determines how a feature of a display corresponding to that data should appear (step 36). As an example, for an attitude display, the integrity monitor may calculate and thus determine where the line ends of the horizon line should appear. In another embodiment, any two points of the horizon line may be employed. Using a "pixel sniffer" and checking the data corresponding to the rendered signal (using, e.g., the "pixel sniffer" data communication line 28 shown in the figure), the integrity monitor 26 may check, to a given category certification level, if the attitude display 16 is showing what it should (step 38). If it is not, an error condition may be output to the attitude display, e.g., a red flag may appear, or the screen may be made blank (such as via shutting off a back light, or even cutting off power to the device). In some cases, a flag or blank screen may alternately appear, depending on the severity of the malfunction. Upon causing a flag to appear, or other error condition, the integrity monitor may then check that the error condition is appearing on the display, and a more severe indication may be given upon recognition that the error condition is not displaying properly.

Other error indications may be used, so long as the pilot is immediately notified that attention is necessary because a device has been lost (step 42). Generally, the error condition should be such that the error is obvious to the pilot, as opposed to a more subtle indication.

In many cases a pixel sniffer is dedicated to just one device. However, in some cases, multiple pixel sniffers may send data, e.g., in alternating time frames, to one integrity monitor, to allow multiple devices to be checked with just one integrity monitor.

Besides the line ends as disclosed above, any other part of the line may be checked for integrity and certification. For airspeed or altitude indicators, the "pixel sniffer" may check a numeric display, such as using correlator functionality, to check if the display is displaying the proper set of numerals (sensed data values) corresponding to the measured sensor data. Such functionality may be enhanced by more detailed knowledge of the display, e.g., the fonts used. The system and method may allow that a match be defined at any specified level of tolerance, such as if over 90% of pixels match. In addition to checking lines and numerals, the system and method may also provide for a check for shapes, such as by comparing to known or expected shapes.

In any case, the pixel sniffer may employ techniques such as pixel decimation and color range comparison.

In this way, all of the benefits of a category A device are obtained, while the more complicated graphical display need be certified only to a lesser category level.

In another implementation, systems and methods according to the principles described here may be employed to provide a degree or level of certification to a resident application such as an operating system, e.g., Linux®. In a Linux® implementation, the operating system provides a robust environment including many seasoned communication stacks, e.g., TCP/IP, USB, and the like. However, Linux® is not certified to the level necessary to be a part of many avionics applications. To eliminate the need to certify all of such an operating system, such certification being highly costly, the avionics application itself may be protected so that the operating system cannot alter the application's operating environment, e.g., application code and data, once the application is loaded and running. In this case, only the application requires certification at the highest level, and not the operating system such as Linux®.

As an initial matter, it is noted that a level of partitioning may be employed. Safety systems commonly require partitioning, so one application does not conflict with another. In this way, if two applications are running in memory, one application cannot affect the operation of the other. One way to enforce such partitioning is by way of a memory manager.

Certain operating systems, such as Linux®, provide just such a memory manager, in Linux® termed a memory management unit or "MMU", but again the same is not certified.

Figure 3:
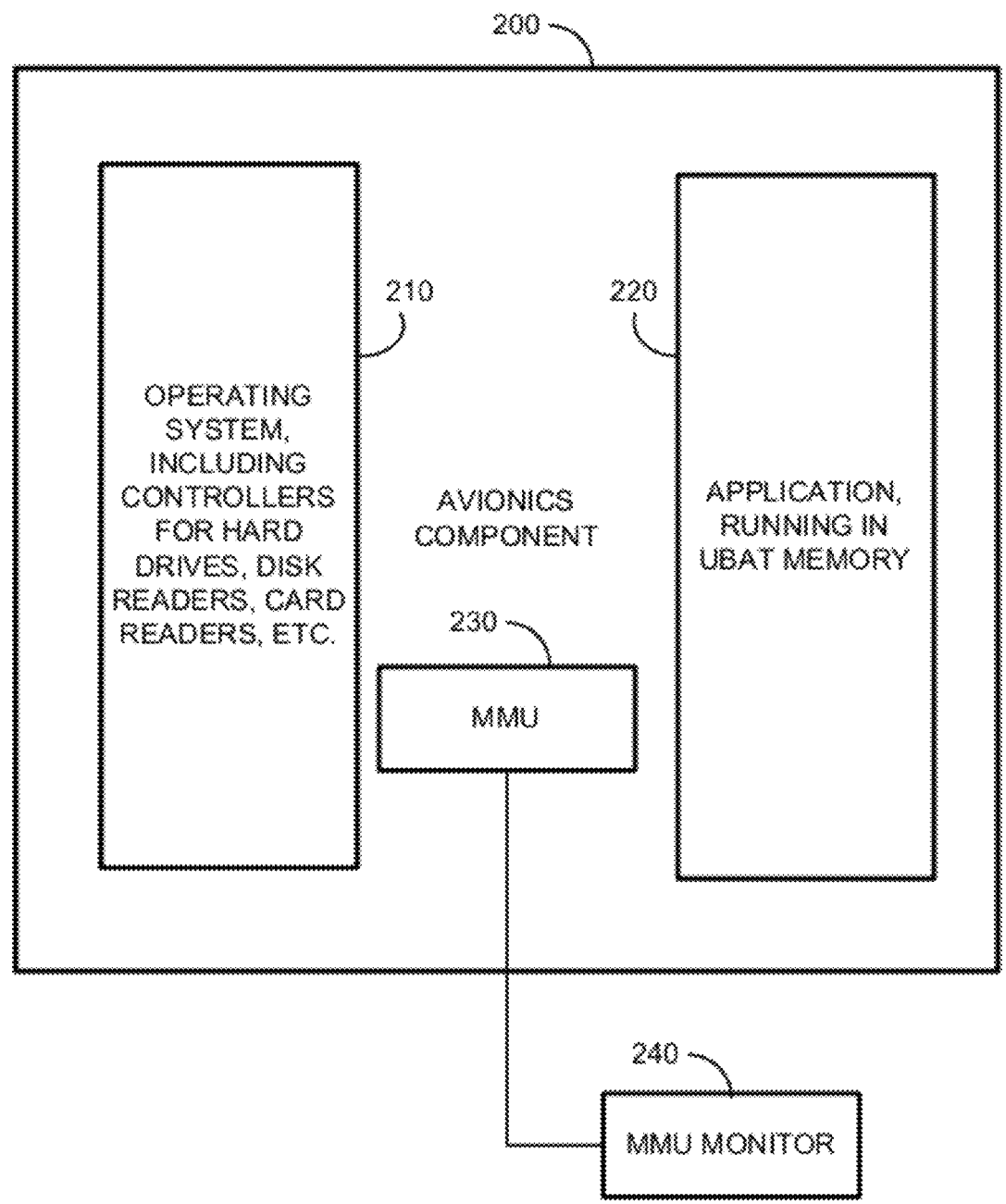
FIG. 3 illustrates a schematic depiction of an avionics component, including an operating system and an application running in memory.
Figure 4:
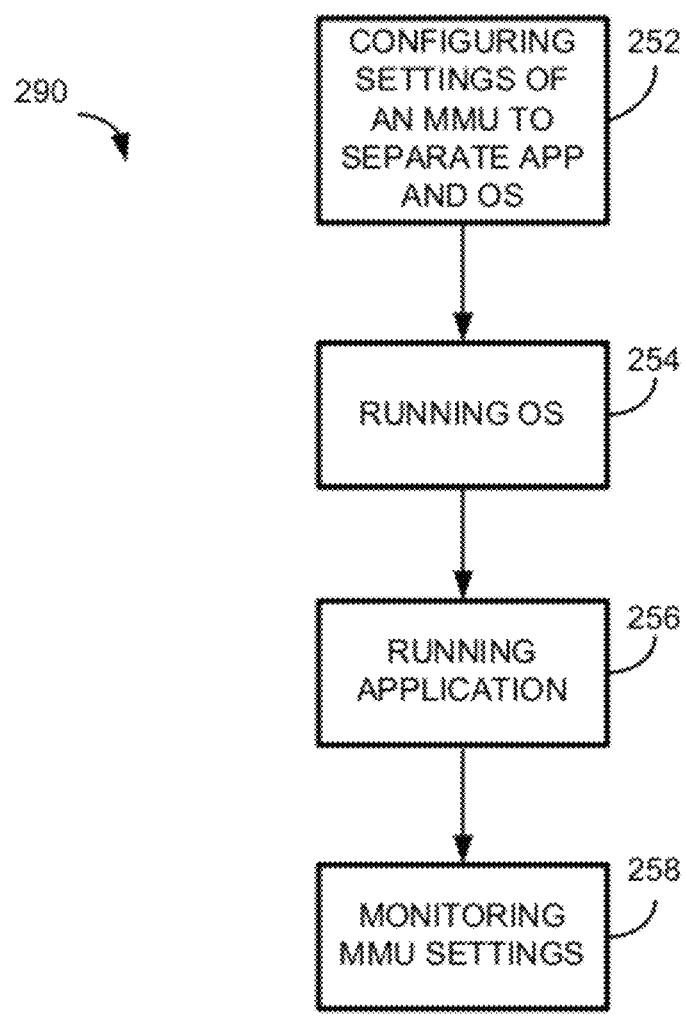
FIG. 4 illustrates a flowchart of another method according the principles described here.

In implementations according to the present principles, and referring to FIG. 3, a system 200 is designed such that an operating system 210 and MMU 230 arranges an application 220 such that the application to 20 is running in its own memory space and such that the operating system can never affect it.

One issue in such an implementation is to verify that the operating system and MMU performed the partitioning task properly and that the partitioning task was not reversed, or otherwise defeated. In one feature of the implementation, a monitor 240 is provided for the MMU, and the monitor 240 reads the settings on the MMU 230, to ensure that the same have not been changed or otherwise modified. Settings may be read on various bases, e.g., per second, per minute, or the like.

In another feature of the implementation, the MMU 230 arranges the memory allocation such that the memory in which the application 220 is run is addressable by the MMU 230 but not by the operating system 210. In other words, the MMU knows the memory is there but not the operating system. As far as the operating system 210 is concerned, it is unaddressable memory. For example, if an application attempted to write into this memory, the operating system 210 would return a page fault.

In yet another feature of certain systems according to the principles described here, the system may be provided with one or more watchdog timers. For example, each thread may be associated with one or more watchdog timers. If the system fails to operate, the watchdog timer may enter an alarm condition and reset the system. In this way, the operating system 210 is rendered substantially irrelevant to the safe operation of the application 200 and, the application thus cannot be corrupted by the operating system, although it could in some implementations reset or turn off, both of which would be highly noticeable events to the pilot.

Figure 5:
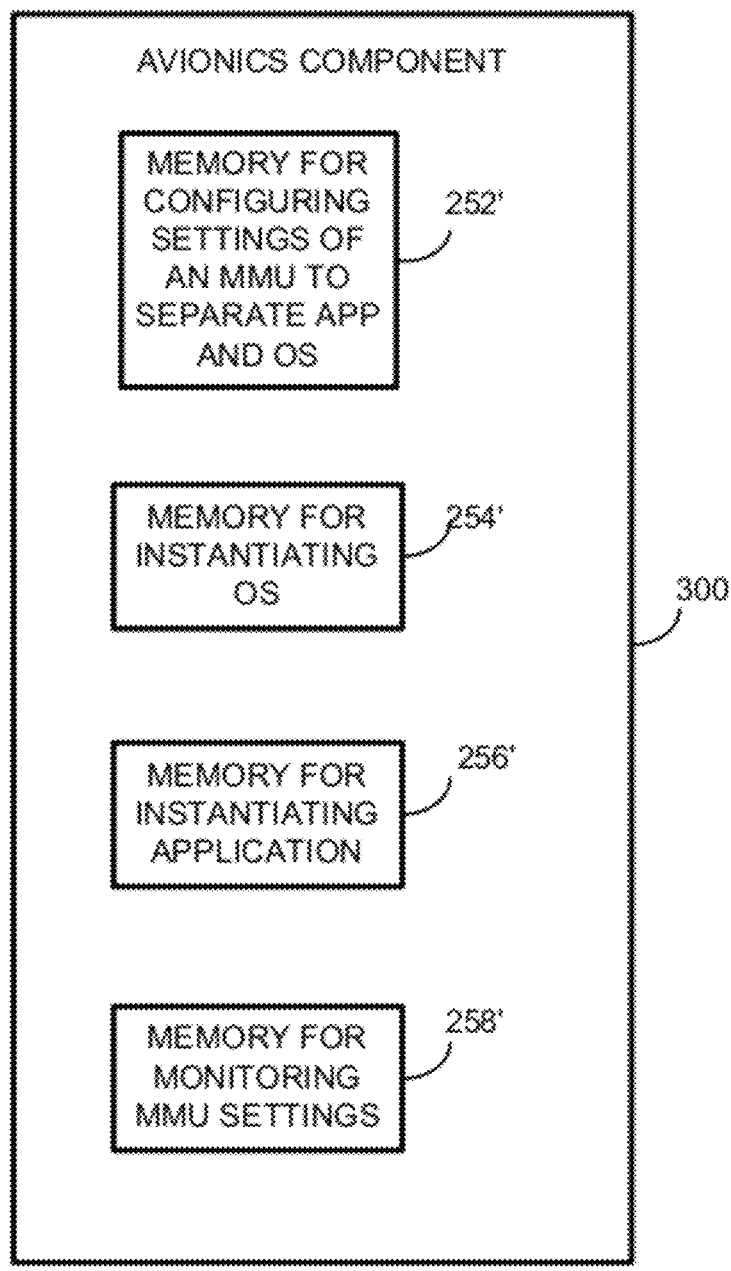
FIG. 5 illustrates another schematic depiction of an avionics component according the principles described here.

In an exemplary method according to the above principles, a flowchart 290 is illustrated in FIG. 5, having a first step of configuring settings of a memory management unit to separate application memory and operating system memory (step 252). The operating system may then be run (step 254), as well as the application (step 256). The MMU settings may then be monitored to ensure that the same are not changed or altered such that application memory may be addressed by the operating system (step 258).

Figure 6:
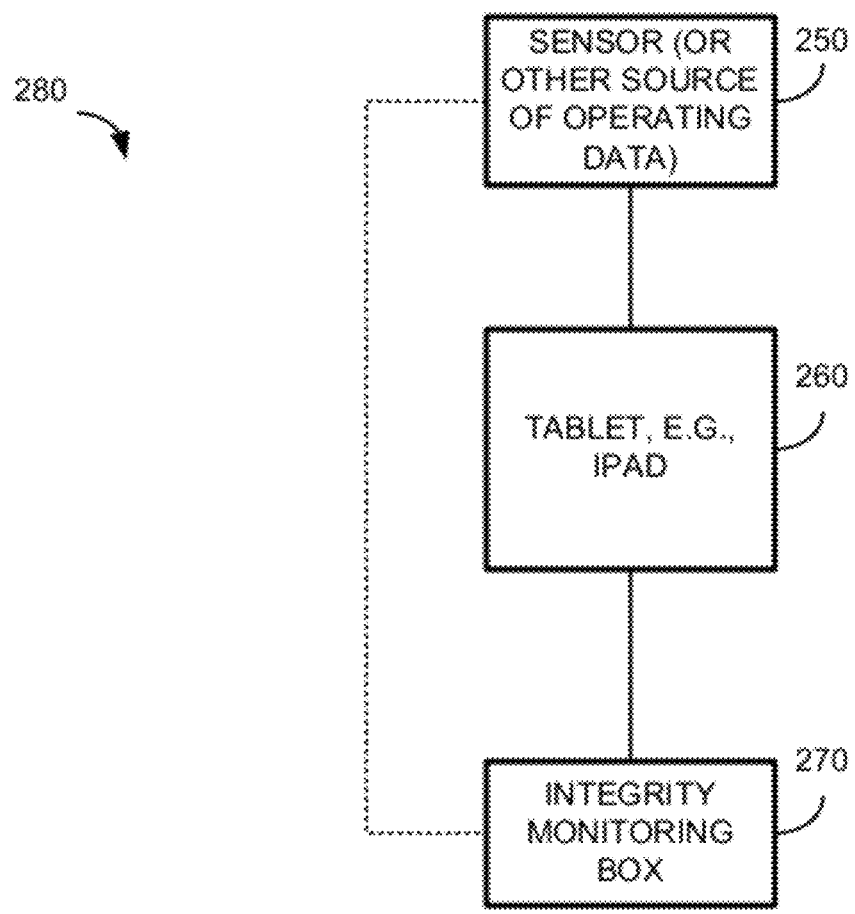
FIG. 6 illustrates a schematic layout of a data source, and a tablet computer for display, where the operation of the tablet computer is monitored by an integrity monitoring box.

An exemplary avionics component 300 is illustrated in FIG. 6, according to the principles described here. The avionics component 300 includes memory 252' for configuring settings associated with the MMU to separate application memory and operating system memory. The component 300 further includes memory 254' for instantiating or otherwise running an operating system. The component 300 further includes memory 256' for instantiating or otherwise running the application, e.g., an avionics application. Finally, the component 300 includes memory 258' for monitoring the MMU settings. Other memories and subsystems will also be understood.

Variations of the above system and method will be seen. The application employed to monitor the MMU may be generally a certified application, e.g., level C. If it was desired to certify such a system to an even higher level, e.g., level A, a system such as that described with respect to FIGS. 1 and 2 may be employed. Alternatively, the application employed to monitor the MMU may itself be level A. In such implementations, the operating system, e.g., Linux®, may be certified at a very low level, or not at all, and still be employed. The monitor 240 employed to monitor the MMU may be of any kind. If a particular avionics instrument is to be monitored at multiple levels of certification within its "box", e.g., a level A portion and a level C portion, an external monitor may be employed to monitor just at the level A portion.

The system described above includes many advantages, including that the very high expense of certified operating systems is avoided.

In a more detailed implementation, the MMU provided by the avionics system's CPU may be employed to protect the application's code and data from the operating system. In an exemplary implementation, a CPU core may be employed that provides a memory management unit or MMU that allows for two types of address translation, page and block. Operating systems such as Linux® use page address translation to map application and kernel address space. Such operating systems also use block address translation to map some of the kernel, e.g., Linux® kernel, which is done at boot time and is not modified once set up. Block address translation may take precedence over page address translation. That is, if a virtual address is mapped by both the page and block mechanisms, the block mechanism will be used to translate the address from virtual to physical space. In a Linux® implementation, Linux® applications may run in user space and the Linux® kernel runs in kernel space.

The MMU also provides two basic address spaces, user and kernel. Various types of protection schemes may be employed: no access to user or kernel space; no access to user space, read only kernel space; no access to user space, read and write from kernel space; read only user space, read only kernel space; read only user space, read and write from kernel space; or read and write from user space, read and write from kernel space. In other words, most MMUs provide stricter access to user space than kernel space. However, in the protection scheme outlined above, stricter access to kernel space than user space is required. In one implementation, using a MPC5121e MMU, the same does not provide for this in hardware. So a scheme was devised to provide the desired protection using software. In the Linux® implementation, the Linux® OS's well-defined interfaces were employed for switching between user and kernel space.

There are basically three mechanisms: the first is a "system call", in which the application traps into the kernel for a particular OS service; the next employs "interrupts", where hardware asynchronously causes a switch from user to kernel space (there is no switch if already in kernel space when the interrupt occurs); and the third is that employing a "signal" (in this implementation, the kernel, asynchronously to the application, switches from kernel space to user space). Thus whenever a switch is made from user space to kernel space, the MMU protection for the application's code and data may be changed from "Read/write user/kernel space" to "Read only user/kernel space". Whenever a switch is made from kernel space to user space, the MMU protection for the application's code and data may be changed from "Read only user/kernel space" to "Read/write user/kernel space".

As noted above, the Linux® OS uses page memory to manage the application address space. Also, the block memory management may be setup at boot time and not altered. So if the block memory management is used to manage the avionic's application's code and data, there are no conflicts with the Linux® OS.

MPC5121e Specific Solution

For the MPC5121e MMU described above, two types of memory management are provided, page and block. In the specific MPC5121e solution, we take advantage of the block address translation (BAT) provided by the MMU. Certain steps of a solution follow:

(1) An operating system character device driver may be written to manipulate MMU BAT registers (termed "UBATDEV"). In this regard it is noted that the hardware cannot be accessed directly from user space, and so the device driver is required.
(2) An area of memory outside the scope of the OS may be reserved and delete configured to be not managed by the operating system, e.g., Linux®.
(3) The application is loaded the application into memory using the normal operating system program loader.
(4) A BAT register is mapped to the area of memory not managed by the OS, e.g., using UBATDEV.
(5) The application's code and data may be copied from the area managed by the operating system to the area not managed by the operating system.

The BAT register may be changed so that the virtual address range overlays the address range specified by the operating system program loader. In this way the MMU is being used to replace the physical memory mapped and managed by the OS to the physical memory outside the scope of the OS; however, the virtual address is the same and as far as the OS is concerned, nothing has changed. In this case, the BAT mapped memory takes precedence over the page mapped memory, using UBATDEV. The BAT register is set to read/write, and this remapping is done in user space. The OS is changed to make the BAT read only when switching to kernel space and read/write when switching to user space.

Linux® OS UBAT Changes

In a specific Linux® implementation, the Linux® OS UBAT changes may be encompassed in the compile-time variable CONFIG_UBAT_MAPPER. For example, the following files may be changed:

```
arch/powerpc/platforms/512x/Kconfig
include/asm-powerpc/thread_info.h
include/asm-powerpc/uaccess.h
arch/powerpc/kernel/asm-offsets.c
arch/powerpc/mm/init_32.c
arch/powerpc/kernel/entry_32.S
arch/powerpc/kernel/head_32.S
arch/powerpc/mm/fault.c
arch/powerpc/platforms/512x/mpc5121_ads.c
```

The BAT registers may then be employed to protect the avionics application. The MPC5121e MMU provides 8 data BATs and 8 instruction BATs. In one implementation of the Linux® OS used for the avionics application, BATs 0-3 are employed for internal use, which leaves BATs 4-7 available for the solution, e.g., DBAT6/DBAT7 and IBAT6/IBAT7. As noted above, it may be necessary to change the BAT registers used for mapping the application to "read-only" when transitioning from user space to kernel space and to "read-write" when transitioning from kernel space to user space.

Also, as noted above, Linux® device drivers are employed to manipulate MMU BAT registers and the same use special routines to copy data between user and kernel space, these routines being generally defined in the include/asm-powerpc/uaccess.h module. It is considered illegal for the application to make a system call which forces the kernel to copy data from kernel space to UBAT mapped user space, as the point of the UBAT mapper is to protect the application from the kernel. Thus, copying from kernel space to UBAT-mapped user space violates such protection. The uaccess.h module may be altered (as indicated with CONFIG_UBAT_MAPPER) to detect situations where the kernel is attempting to write to UBAT-mapped user space.

In one case, the inline function ubat_mapped( ) is added to the include/asm-powerpc/uaccess.h module. This routine returns non-zero if the specified virtual address range (addr/size) is UBAT-mapped in the current task. Otherwise, zero is returned.

The ubat_mapped( ) function may use the ubat_start and ubat_end fields added to the thread_info structure. These values will be zero in tasks that are not UBAT mapped and non-zero as set up by the ubatdev device driver in UBAT-mapped tasks.

The following purely exemplary lines of code may be added to the inline access_ok( ) function to catch kernel writes to UBAT-mapped memory:

```
        if (type == VERIFY_WRITE && ubat_mapped(addr, size))
            return 0;
#ifdef CONFIG_UBAT_MAPPER
#define original_access_ok(type, addr, size)        \
        (__chk_user_ptr(addr),                      \
         __access_ok((__force unsigned long)(addr), (size), get_fs( )))
static inline int ubat_mapped(const void __user* addr, unsigned long size)
{
    unsigned long start = current_thread_info( )->ubat_start;
    if (unlikely(start)) {
        unsigned long end = current_thread_info( )->ubat_end;
        int mapped = (((unsigned long)addr) + size > start) &&
                     (((unsigned long)addr) <= end);
        if (unlikely(mapped)) {
            extern void print_ubat_mapping(const char* func,
                    const void __user* addr,
                    unsigned long size);
            print_ubat_mapping(__FUNCTION__, addr, size);
            return 1;
        }
    }
    return 0;
}
static inline int access_ok(int type,
            const void __user* addr,
            unsigned long size)
{
    if (type == VERIFY_WRITE && ubat_mapped(addr, size))
        return 0;
    return original_access_ok(type, addr, size);
}
#else
static inline int ubat_mapped(const void __user* addr, unsigned long size) {return 0;}
#define access_ok(type, addr, size)        \
        (__chk_user_ptr(addr),             \
         __access_ok((__force unsigned long)(addr), (size), get_fs( )))
#endif
```

In yet another implementation, and referring to the system 280 of FIG. 6, an uncertified device such as a tablet 260 or other computer, e.g., an iPad®, may be configured for use as a flight instrument, certified by a wired or wireless connection to a circuit or application which checks its integrity, which may simply be embodied in a handheld box 270. In essence, the integrity monitoring circuit or application "integrity monitors" a remote application. The tablet 260 may, e.g., display data from a sensor or other source 250 of operational data.

Figure 7:
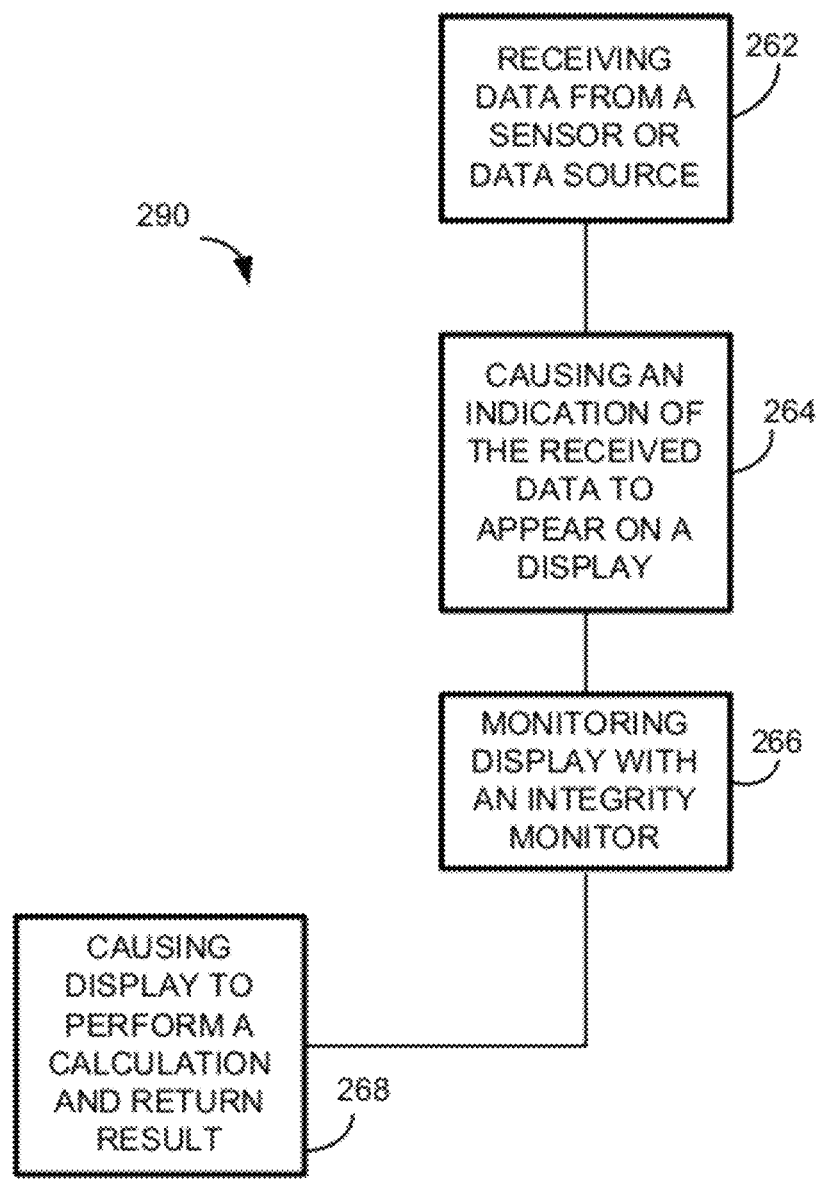
FIG. 7 illustrates a flowchart of another method according the principles described here.

In the method illustrated by flowchart 290 of FIG. 7, a first step is to receive data from a sensor or data source (step 262). An indication is then made of the received data and caused to appear on a display (step 264). The display is then monitored with an integrity monitor (step 266). The integrity monitor may check the display by methods disclosed above, e.g., with the pixel sniffer, or may cause the display to perform a calculation and to return the result (step 268). In this way, the display application may be checked to see if it is operating properly, e.g., has encountered an error, has crashed, or the like.

In more detail, the application running on the tablet or other computer may communicate through a normal wireless channel like Bluetooth® to a device, e.g., a sensor. The monitor may be configured such that if it does not receive monitored information from the host, then it can independently produce a flag or other annunciation to alert an operator that there is something wrong with the system.

Besides as a separate box, the monitor may also be situated with the watchdog circuits noted above, and as such may communicate to the host through a remote channel, e.g., the wireless Bluetooth® channel. Various aspects may be monitored. For example, the display pixel, execution flow, or the like. For example, a calculation using a known value, and thus calculating a known result (step 268), may be asked of the tablet or other monitored application, and successful performance of the calculation may cause an "OK" signal to be returned.

In another example, if the program is executing different threads, one or more of the same may be monitored and the same may report back that the sensor (or other host or application) is operating normally. If not, the monitor may shut down the tablet or other computer, or may otherwise give a signal or other annunciation or alert to indicate improper operation being detected.

In this way, the tablet or other computer may serve as a part of a complete avionics system operating in the aircraft, monitored by a small box. Currently, such tablets may be employed for functions such as charting, but with systems and methods according to the principles disclosed here, the same may be employed even as standby instrumentation.

The monitoring box may employ standalone hardware, configured for performing monitoring functions, e.g., for transmitting test calculations and values and receiving results. The same may be an interface box, may have sensors within, or may even include an entire sensor suite. For example, the tablet may have a GPS unit or it may monitor a GPS unit.

While tablet computers such as iPad®s have been disclosed, it will be understood that any computing device may be monitored using the principles disclosed above.

Systems and methods according to principles disclosed here may be fully implemented in any number of computing devices. Typically, instructions are laid out on computer-readable media, generally non-transitory, and these instructions are sufficient to allow a processor in the computing device to implement the method of the invention. The computer-readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that may be seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or WiFi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where aircraft components is monitored, the plural inputs may allow plural sensors or sources to be monitored at one time.

Of course, various aspects, components, or steps of the embodiments described above may be replaced with others and still fall within the scope of the invention. For example, the pixel sniffer may be replaced with any data analyzer that can determine if a particular pixel or group of pixels is a particular color or at a particular state of activation. The attitude monitor described may be replaced by, or accompanied by, any other type of device, such as are named above, as well as others. Therefore, the scope of the invention is to be limited solely by the claims appended here, and equivalents thereof.

The invention claimed is:

1. A method of operating an avionics component, comprising:
   a. configuring settings of a memory management unit to allocate a region of memory for an operating system and a region of memory for an application, the two regions non-overlapping;
   b. running an operating system for the avionics component, within a memory region allocated to the operating system;
   c. running the application, the application associated with the avionics component within a memory region allocated to the application; and
   d. monitoring, at predefined intervals, the memory management unit to ensure the operating system cannot alter memory allocated to the application;
   e. wherein the memory management unit is monitored to ensure that the operating system cannot write to memory allocated to the application.

2. The method of claim 1, wherein the memory management unit is monitored to ensure the operating system cannot address memory allocated to the application.

3. The method of claim 1, wherein if the monitoring indicates that the settings are such that the operating system can alter memory associated with the application, then further comprising causing an alert.

4. The method of claim 3, wherein the alert is visible or audible.

5. The method of claim 4, wherein the alert is a substantially blank screen.

6. The method of claim 1, wherein the application is selected from the group consisting of: an altimeter, an airspeed indicator, a navigational indicator, and an attitude indicator.

7. The method of claim 1, wherein the monitoring includes monitoring a plurality of memory management units.

8. The method of claim 1, wherein the memory management unit, operating system, and application, are associated with the same avionics component.

9. The method of claim 1, wherein the memory management unit configures memory allocation such that application memory is unaddressable by the operating system.

10. A non-transitory computer-readable medium containing instructions for causing a computer to execute the method of claim 1.

11. An avionics component, comprising:
   a. memory containing instructions for causing instantiation of an operating system;
   b. memory containing instructions for causing instantiation of an application;
   c. memory, configured by settings, containing instructions for separating the memories containing instructions for causing instantiation of an operating system and instantiation of an application; and
   d. memory containing instructions for checking, at predefined intervals, the operation of the memory configured by settings, to ensure the operating system cannot write to memory allocated to the application.

* * * * *